United States Patent
van Kalken et al.

(10) Patent No.: US 9,373,978 B2
(45) Date of Patent: Jun. 21, 2016

(54) UNINTERRUPTIBLE POWER SUPPLY APPARATUS FOR RECEIVING POWER FROM DIFFERENT ELECTRICAL UTILITY CONFIGURATIONS

(75) Inventors: Christian van Kalken, Muralto (CH); Sanjay Agrawal, Bangalore (IN)

(73) Assignee: General Electric Company, Schenectady, NY (US)

( * ) Notice: Subject to any disclaimer, the term of this patent is extended or adjusted under 35 U.S.C. 154(b) by 879 days.

(21) Appl. No.: 13/556,836

(22) Filed: Jul. 24, 2012

(65) Prior Publication Data

US 2014/0028099 A1    Jan. 30, 2014

(51) Int. Cl.
*H02J 9/06* (2006.01)
*H02M 1/10* (2006.01)

(52) U.S. Cl.
CPC ............... *H02J 9/061* (2013.01); *H02M 1/10* (2013.01); *Y10T 307/615* (2015.04)

(58) Field of Classification Search
None
See application file for complete search history.

(56) References Cited

U.S. PATENT DOCUMENTS

| | | | |
|---|---|---|---|
| 5,319,533 A * | 6/1994 | Reynolds et al. ............... | 363/17 |
| 5,365,906 A | 11/1994 | Deweerdt | |
| 5,680,847 A | 10/1997 | Begley et al. | |
| 5,726,561 A | 3/1998 | Ghosh et al. | |
| 5,813,830 A | 9/1998 | Smith et al. | |
| 6,147,882 A * | 11/2000 | Huber ..................... | H02M 1/10 363/143 |
| 6,266,260 B1 * | 7/2001 | Zahrte, Sr. ............. | H02M 1/10 363/132 |
| 6,538,909 B2 * | 3/2003 | Goodarzi ................ | H02M 1/10 363/132 |
| 6,548,985 B1 * | 4/2003 | Hayes et al. .................. | 320/108 |
| 6,555,000 B2 | 4/2003 | Knight | |
| 6,563,721 B1 | 5/2003 | Rapeanu | |
| 6,720,675 B2 * | 4/2004 | Azuma ................... | H02J 7/022 307/82 |
| 7,096,899 B2 | 8/2006 | Vetter et al. | |
| 7,259,477 B2 * | 8/2007 | Klikic et al. .................... | 307/65 |
| 7,362,599 B2 | 4/2008 | Rapeanu | |
| 7,375,989 B2 * | 5/2008 | Colombi et al. ................ | 363/44 |
| 7,555,946 B2 | 7/2009 | Sawert et al. | |
| 7,679,943 B2 | 3/2010 | O'Bryant et al. | |
| 7,785,145 B2 | 8/2010 | Menez | |
| 7,828,509 B2 | 11/2010 | Morris et al. | |
| 8,503,208 B2 * | 8/2013 | Krause .......................... | 363/127 |
| 2001/0030148 A1 | 10/2001 | Knight | |
| 2005/0178469 A1 | 8/2005 | Vetter et al. | |
| 2006/0164873 A1 | 7/2006 | Colombi et al. | |
| 2007/0214882 A1 | 9/2007 | Sawert et al. | |
| 2008/0053060 A1 | 3/2008 | Olver | |
| 2008/0199302 A1 | 8/2008 | Morris et al. | |

(Continued)

OTHER PUBLICATIONS

K. Matsui, M. Hasegawa (2010). "A Novel PFC Circuit for Three-Phase Utilizing Single Switching Device", Trends in Telecommunications Technologies, Christos J Bouras (Ed.), ISBN: 978-953-307-072-8, InTech, retrieved from <http://cdn.intechopen.com/pdfs-wm/9701.pdf>.*

*Primary Examiner* — Rexford Barnie
*Assistant Examiner* — David Shiao
(74) *Attorney, Agent, or Firm* — Barclay Damon, LLP (57) ABSTRACT

An uninterruptible power supply (UPS) apparatus is disclosed that can receive power from different electrical utility configurations. The input stage of the UPS includes a three phase rectifier bridge design having three legs configured for connection to the different electrical utility configurations. An advantage that may be realized in the practice of some disclosed embodiments of the UPS input stage is that a single UPS can have the flexibility to be used with different electrical utility configurations having different voltages and phases.

5 Claims, 6 Drawing Sheets

(56) References Cited

U.S. PATENT DOCUMENTS

2010/0091529 A1* 4/2010 Jakeman et al. ............... 363/36
2010/0117453 A1   5/2010 Langgood et al.
2010/0201197 A1* 8/2010 Shires et al. .................. 307/73
2010/0278642 A1  11/2010 Olver
2010/0307151 A1  12/2010 French
2010/0315849 A1* 12/2010 Ingemi et al. ................. 363/89

* cited by examiner

UNINTERRUPTIBLE POWER SUPPLY APPARATUS FOR RECEIVING POWER FROM DIFFERENT ELECTRICAL UTILITY CONFIGURATIONS

BACKGROUND OF THE INVENTION

The subject matter disclosed herein relates to an uninterruptible power supply (UPS), and in particular, a UPS input stage that can receive power from different electrical utility configurations.

Uninterruptible Power Supplies are used to provide clean power to critical loads (e.g., protected equipment such as computers, data centers, cash registers) even if the input power source fails. A UPS can provide instantaneous protection from input power source interruptions by supplying energy stored in batteries or other capacitive devices that can power the protected equipment for a sufficient amount of time to start a backup power source or properly shut down the protected equipment. Since critical loads can be found in a variety of residential or commercial locations having different electrical utility configurations (e.g., different alternating current (AC) voltages (120V, 208V, 240V) and/or different number of phases (1 or 2) with different phase angles (120°, 180°, or 240°)). Different UPS's have to be designed for connecting to the different electrical utility configurations.

Figure 1:
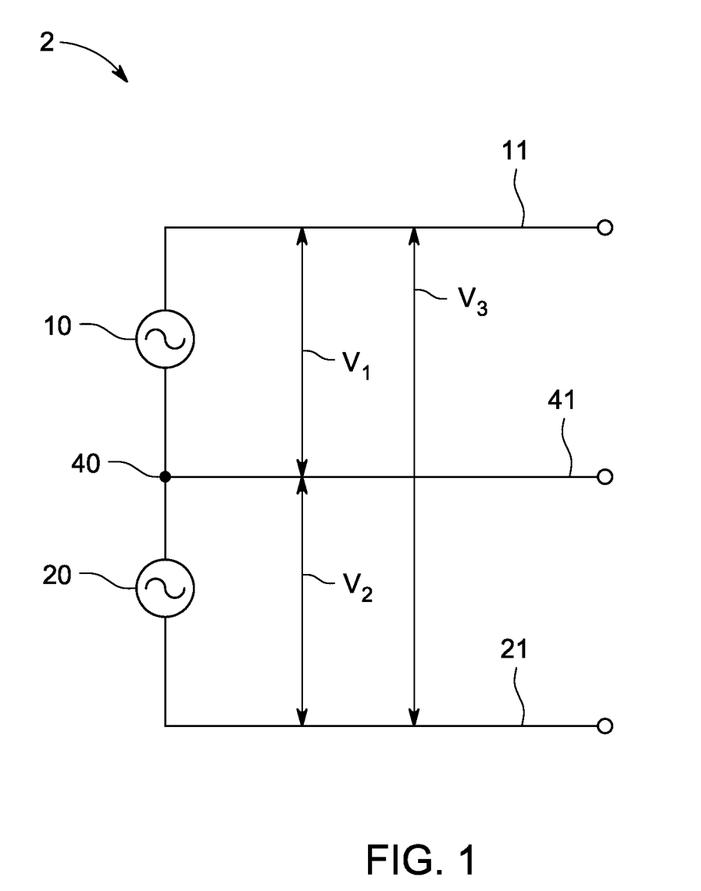
FIG. 1 is a schematic diagram of an exemplary electrical utility configuration.

FIG. 1 is a schematic diagram of an illustrative and exemplary electrical utility configuration 2, having a first voltage source 10 with a first voltage source line (LINE 1) 11, a second voltage source 20 with a second voltage source line (LINE 2) 21, a neutral node (or center tap) 40 with a neutral 41 located between and connecting the first voltage source 10 and the second voltage source 20. The exemplary electrical utility configuration 2 can be representative of a conventional single phase three-wire electrical utility configuration also referred to as a split-phase system or a center-tapped neutral system, since it can be formed by, e.g., center-tapping the secondary winding of a transformer (or generator/alternator) to form a first voltage source 10 and a second voltage source 20. The exemplary service can be representative of two phases of a three-phase four-wire wye electrical utility configuration or two phases of a three-phase three-wire delta electrical utility configuration.

In one example, a first single phase input voltage ($V_1$) between the first voltage source line (LINE 1) 11 and the neutral node 40 is 120VAC at a phase angle of 0°, while the second single phase input voltage ($V_2$) between the second voltage source line (LINE 2) 21 and the neutral node 40 is 120VAC at a phase angle of 180°. Without connecting the neutral 41, the single phase input voltage ($V_3$) between the first voltage source line (LINE 1) 11 and the second voltage source line (LINE 2) 21 is 240VAC. By connecting the neutral 41, a split phase input voltage can be provided with a phase difference of 180° between the two voltage sources 10, 20.

In another example, the first single phase input voltage ($V_1$) between the first voltage source line (LINE 1) 11 and the neutral node 40 is 120VAC at a phase angle of 0°, while the second single phase input voltage ($V_2$) between the second voltage source line (LINE 2) 21 and neutral 40 is 120VAC at a phase angle of 120° or 240°. Without connecting the neutral 41, the single phase input voltage ($V_3$) between the first voltage source line (LINE 1) 11 and the second voltage source line (LINE 2) 21 is 208VAC. By connecting the neutral 41, a split phase input voltage can be provided with a phase difference of 120° or 240° between the two voltage sources 10, 20.

The design of a UPS for a single phase input voltage of 120VAC will be different than the design of a UPS for a single phase input voltage of 208VAC or 240VAC. Similarly, the design of a UPS for a single phase input voltage will be different than the design of a UPS for a split phase input voltage. In addition, since some electrical utility configurations do not have a neutral (e.g., 208VAC or 240VAC single phase) while other electrical utility configurations do have a neutral (e.g., 120VAC single phase), different UPS designs must be provided for these different electrical utility configurations. The requirement for different UPS designs for all of the different possible electrical utility configurations limits the flexibility of the use of the UPS's to protect equipment. For example, a company with locations in areas having different electrical utility configurations would need to purchase and stock a number of different types of UPS to protect its equipment in the different locations where it has operations.

The discussion above is merely provided for general background information and is not intended to be used as an aid in determining the scope of the claimed subject matter.

BRIEF DESCRIPTION OF THE INVENTION

An uninterruptible power supply (UPS) apparatus is disclosed that can receive power from different electrical utility configurations. The input stage of the UPS includes a three phase rectifier bridge design having three legs configured for connection to the different electrical utility configurations. An advantage that may be realized in the practice of some disclosed embodiments of the UPS input stage is that a single UPS can have the flexibility to be used with different electrical utility configurations having different voltages and phases.

In one embodiment, a UPS apparatus for receiving power from different electrical utility configurations. The apparatus comprises a three phase rectifier bridge comprising a first leg comprising a first rectifier diode and a second rectifier diode with a first leg node located between and connecting the first and second rectifier diodes, a second leg comprising a third rectifier diode and a fourth rectifier diode with a second leg node located between and connecting the third and fourth rectifier diodes, and a third leg comprising a fifth rectifier diode and a sixth rectifier diode with a third leg node located between and connecting the fifth and sixth rectifier diodes, wherein the first leg, the second leg, and the third leg are connected in parallel; a switch connected in parallel with the three phase rectifier bridge; a direct current output circuit connected in parallel with the three phase rectifier bridge and the switch, the direct current output circuit comprising a first output bus and a second output bus with an output bus ground node located between and connecting the first output bus and the second output bus; a first UPS input connected to the second leg node of the three phase rectifier bridge with a first input filter inductor located between and connecting the first UPS input to the second leg node; and a second UPS input connected to the third leg node of the three phase rectifier bridge with a second input filter inductor located between and connecting the second UPS input to the third leg node; and a third UPS input connected to the output bus ground node.

In another embodiment, the UPS apparatus further comprises a power distribution unit (PDU) for providing an interface for connecting the different electrical utility configurations to the UPS, the power distribution unit comprising a first PDU output connected to the first UPS input, a second PDU output connected to the second UPS input, and a third PDU output connected to the third UPS input.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 2:
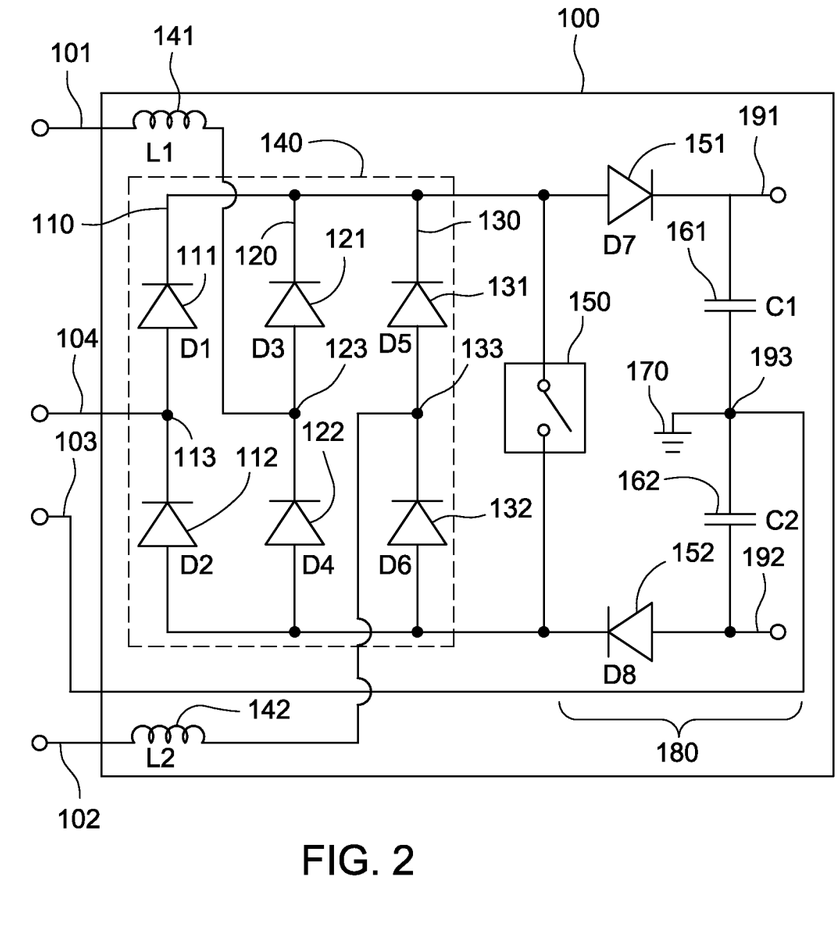
FIG. 2 is a schematic diagram of an exemplary input stage of an uninterruptible power supply (UPS)

FIG. 2 is a schematic diagram of an exemplary input stage 100 of a uninterruptible power supply (UPS) for receiving power from different electrical utility configurations from, e.g., the exemplary electrical utility configuration 2 of FIG. 1. As explained, the exemplary electrical utility configuration 2 can provide several different electrical utility configurations to the UPS input stage 100, including single phase input voltages ($V_1$=120VAC, $V_3$=208VAC/240VAC) and split phase input voltages (with phase angles between the first voltage source 10 and the second voltage source 20 of 120°, 180°, or 240°).

The UPS input stage 100 includes a three phase rectifier bridge 140 having a first leg 110, a second leg 120, and a third leg 130 connected in parallel. The first leg 110 includes a first rectifier diode (D1) 111 and a second rectifier diode (D2) 112 with a first leg node 113 located between and connecting the two diodes 111, 112. The second leg 120 includes a third rectifier diode (D3) 121 and a fourth rectifier diode (D4) 122 with a second leg node 123 located between and connecting the two diodes 121, 122. The third leg 130 includes a fifth rectifier diode (D5) 131 and a sixth rectifier diode (D6) 132 with a third leg node 133 located between and connecting the two diodes 131, 132. It will be understood that the term "connecting" as used herein includes indirectly and directly connecting (i.e., two components are connected to each other even if there are additional components in between).

In one embodiment, the UPS input stage 100 further includes a switch 150 connected in parallel with the three phase rectifier bridge 140. In one embodiment, the switch 150 can comprise one or more insulated gate bipolar transistors (IGBT's), while in another embodiment, the switch can comprise one or more metal-oxide-semiconductor field-effect transistor (MOSFET's). Conventional strategies for modulating the switch 150 can be used to control the operation of the three phase rectifier bridge 140.

In one embodiment, the UPS input stage 100 further includes an direct current (DC) output circuit 180 connected in parallel with the three phase rectifier bridge 140 and the switch 150. The DC output circuit 180 comprises a first output bus capacitor (C1) 161 (e.g., 4000 µF) and a second output bus capacitor (C2) 162 (e.g., 4000 µF). An output bus ground node 193 is located between and connects the first output bus capacitor 161 and the second output bus capacitor 162. The output bus ground node 193 is connected to ground 170. The DC output circuit 180 also comprises a seventh rectifier diode (D7) 151 located between and connecting the switch 150 and the first output bus capacitor 161, with the anode connected to the switch 150 and the cathode connected to the first output bus capacitor 161. Similarly, the DC output circuit 180 comprises an eighth rectifier diode (D8) 152 located between and connecting the switch 150 and the second output bus capacitor 162, with the cathode connected to the switch 150 and the anode connected to the second output bus capacitor 162.

In one embodiment, the UPS input stage 100 has four inputs 101, 102, 103, 104. A first UPS input 101 is configured for connecting to the first voltage source line (LINE1) 11 (FIG. 1) and is connected via a first input filter inductor (L1) 141 (e.g., 1.0 mH) to the second leg node 123 of the three phase rectifier bridge 140. A second UPS input 102 is configured for connecting to the second voltage source line (LINE2) 21 (FIG. 1) and is connected via a second input filter inductor (L2) 142 (e.g., 1.0 mH) to the third leg node 133 of the three phase rectifier bridge 140. A third UPS input 103 is configured for connecting to the neutral 41 of the electrical utility configuration 2 (FIG. 1) and is connected to the output bus ground node 193, which is connected to ground 170. A fourth UPS input 104 is configured for connecting to the neutral node (or center tap) 40 neutral 41 of the electrical utility configuration 2 for a 120VAC single phase input voltage ($V_1$) (FIG. 1) and is connected to the first leg node 113 of the three phase rectifier bridge 140.

The UPS input stage 100 has a first UPS output 191 taken across the first output bus capacitor (C1) 161 to ground 170, which provides a positive DC output voltage (e.g., +220VDC). The UPS input stage 100 also has a second UPS output 192 taken across the second output bus capacitor (C2) 162 to ground 170, which provides a negative DC output voltage (e.g., −220VDC). The UPS input stage 100 illustrated in FIG. 1 is designed to provide approximately the same first UPS output 191 (e.g., +220VDC) and second UPS output 192 (e.g., −220VDC) for different electrical utility configurations.

Figure 3:
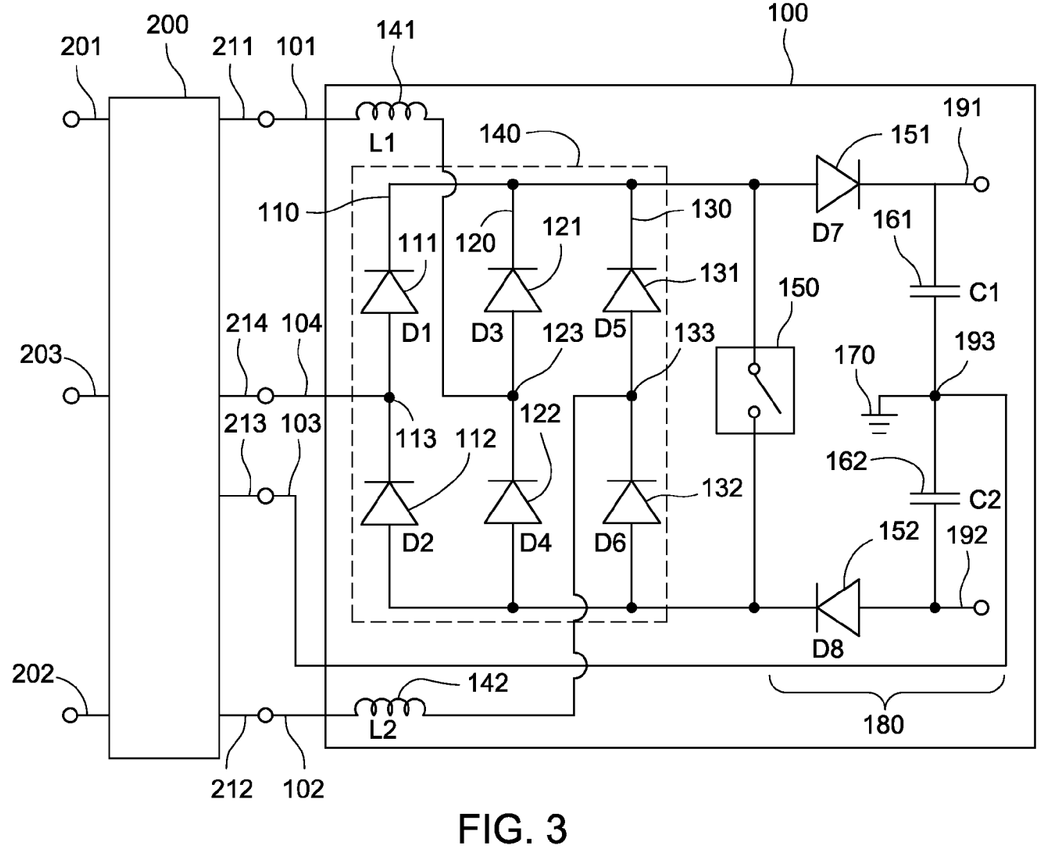
FIG. 3 is a schematic diagram of the exemplary input stage of a UPS of FIG. 2 with a power distribution unit (PDU)

FIG. 3 is a schematic diagram of the exemplary UPS input stage 100 of FIG. 2 with a power distribution unit (PDU) 200, which is configured for providing an interface for connecting different electrical utility configurations to the UPS input stage 100. It will be understood that the PDU 200 can be provided as a separate unit or can be integrated as part of the UPS input stage 100. In one embodiment, the PDU 200 has three inputs 201, 202, 203. A first PDU input 201 is configured for connecting to the first voltage source line (LINE1) 11 (FIG. 1). A second PDU input 202 is configured for connecting to the second voltage source line (LINE2) 21 (FIG. 1). A third PDU input 203 is configured for connecting to the neutral node (or center tap) 40 via the neutral 41 of the electrical utility configuration 2 (FIG. 1).

In one embodiment, the PDU 200 has four outputs for connecting to the inputs 101, 102, 103, 104 of the UPS input stage 100. For example, a first PDU output 211 is configured for connecting to the first UPS input 101 (which is configured for connecting to the first voltage source line (LINE1) 11 (FIG. 1)). A second PDU output 212 is configured for connecting to the second UPS input 102 (which is configured for connecting to the second voltage source line (LINE2) 21 (FIG. 1)). A third PDU output 213 is configured for connecting to the third UPS input 103 (which is configured for connecting to the neutral 41 of the electrical utility configuration 2 (FIG. 1)). A fourth PDU output is configured for connecting to the fourth UPS input 104 (which is configured for connecting for connecting to the neutral 41 of the electrical utility configuration 2 for a two-wire 120VAC single phase input voltage ($V_1$) (FIG. 4)).

Figure 4:
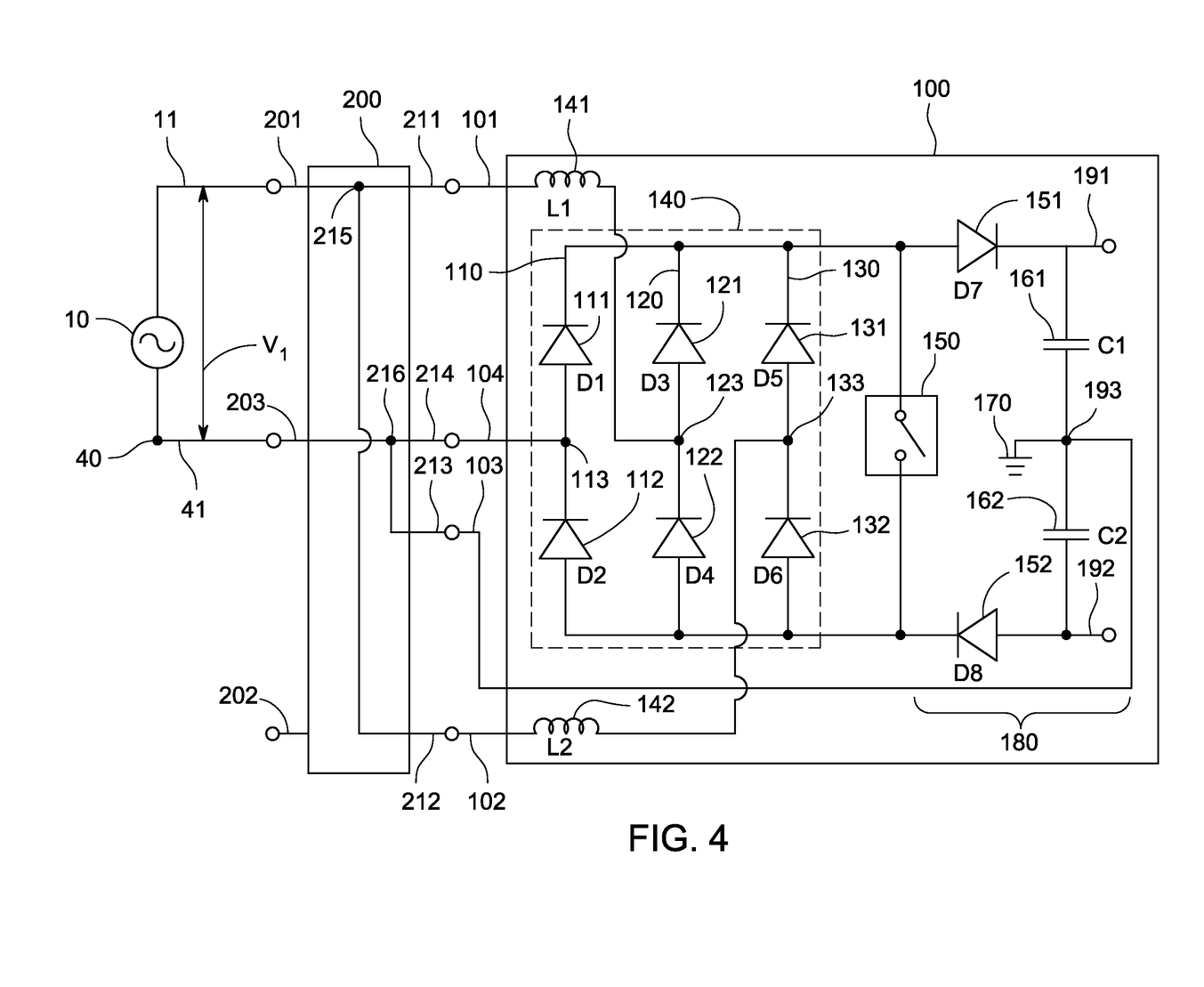
FIG. 4 is a schematic diagram of the exemplary UPS input stage of FIG. 3 connected to the exemplary electrical utility configuration of FIG. 1 with the neutral connected to the UPS for a two-wire 120VAC single phase input voltage.

FIG. 4 is a schematic diagram of the exemplary UPS input stage 100 of FIG. 3 connected to the exemplary electrical utility configuration 2 of FIG. 1 with the neutral 41 connected to the UPS input stage 100 for a two-wire 120VAC single phase input voltage ($V_1$=120VAC at a phase angle of 0°). The configuration of FIG. 4 for the two-wire 120VAC single phase input voltage will provide a positive DC output voltage (e.g., of approximately +220VDC) at the first UPS output 191 and a negative DC output voltage (e.g., of approximately −220VDC) at the second UPS output 192.

The first voltage source line (LINE 1) 11 is connected to both the first UPS input 101 (which is connected to the second leg node 123 of the three phase rectifier bridge 140) and the second UPS input 102 (which is connected to the third leg node 133 of the three phase rectifier bridge 140). The neutral 41 of the electrical utility configuration 2 (FIG. 1) is connected to both the third UPS input 103 (which is connected to the output bus ground node 193) and the fourth UPS input 104 (which is connected to the first leg node 113 of the three phase rectifier bridge 140). In one embodiment, the neutral node 40 and the neutral 41 of the electrical utility configuration 2 (FIG. 1) are connected to ground. Since the first input filter inductor (L1) 141 is connected in parallel with the second input filter inductor (L2) 142, current through each of the input filter inductors 141, 142 at this lower input voltage (120VAC) is halved (i.e., similar to the current for a higher input voltage of 240VAC) allowing for the use of smaller sized input filter inductors 141, 142 (e.g., 1.0 mH).

In one embodiment, the connections between the first voltage source 10 and the UPS input stage 100 can be made directly, while in another embodiment as shown in FIG. 4, the PDU 200 can be employed to provide an interface between the first voltage source 10 and the UPS input stage 100 inputs 101, 102, 103, 104. The first voltage source line (LINE 1) 11 is connected to the first PDU input 201, which is connected through the PDU 200 to the first PDU output 211, which can then be connected to the first UPS input 101. A first PDU node 215 within the PDU 200 also connects the first PDU input 201, which is connected to the first voltage source line (LINE 1) 11, to the second PDU output 212, which can then be connected to the second UPS input 102. Similarly, the neutral 41 of the electrical utility configuration 2 (FIG. 1) is connected to the third PDU input 203, which is connected through the PDU 200 to the third PDU output 213, which can then be connected to the third UPS input 103. A second PDU node 216 within the PDU 200 also connects the third PDU input 203, which is connected to the neutral 41 of the electrical utility configuration 2 (FIG. 1), to the fourth PDU output 214, which can then be connected to the fourth UPS input 104.

Figure 5:
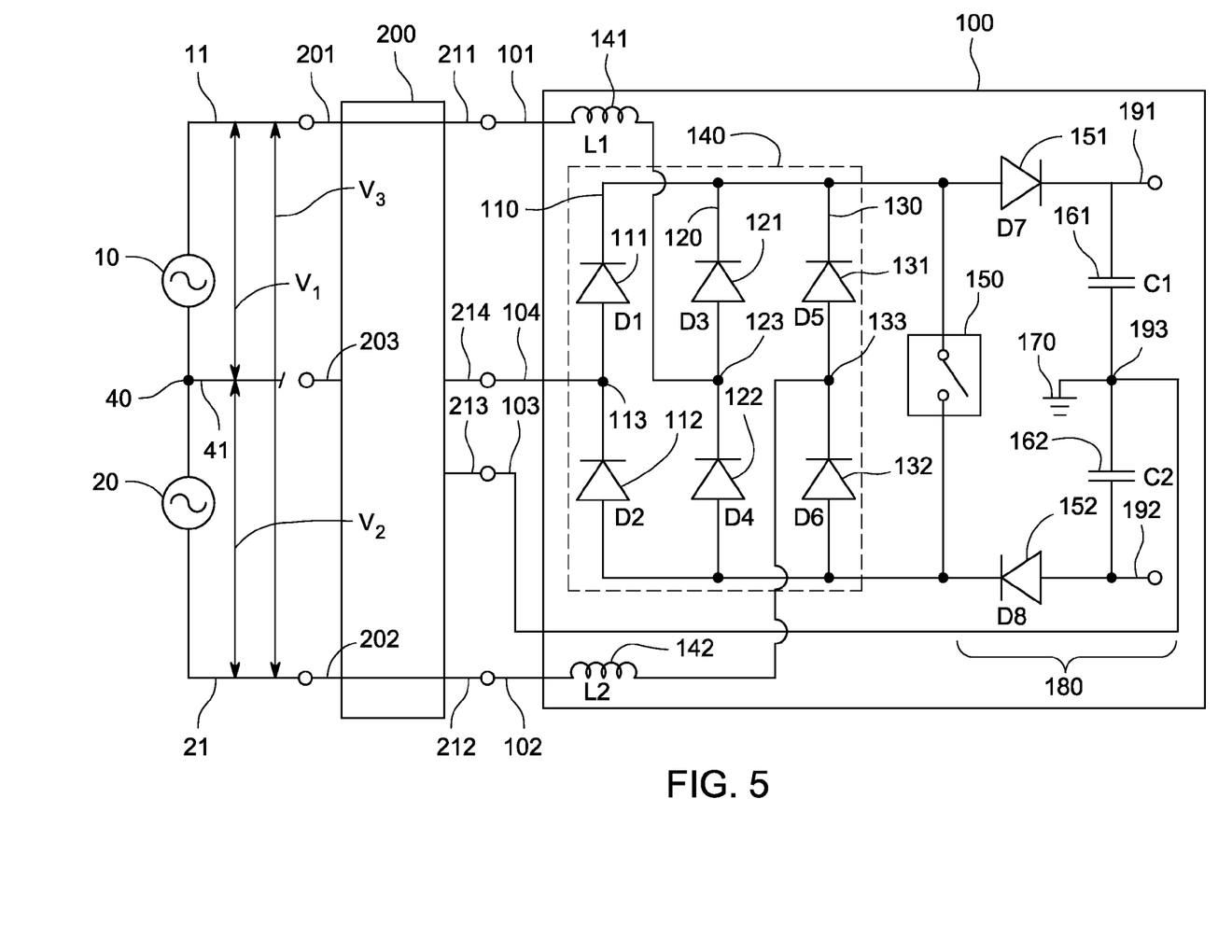
FIG. 5 is a schematic diagram of the exemplary UPS input stage of FIG. 3 connected to the exemplary electrical utility configuration of FIG. 1 without a neutral connected to the UPS for a two-wire 208VAC/240VAC single phase input voltage.

FIG. 5 is a schematic diagram of the exemplary UPS input stage 100 of FIG. 3 connected to the exemplary electrical utility configuration 2 of FIG. 1 without a neutral 41 connected to the UPS input stage 100 for a two-wire 208VAC/240VAC single phase input voltage ($V_3$=208/240VAC). The configuration of FIG. 5 for the two-wire 208VAC/240VAC single phase input voltage will provide a positive DC output voltage (e.g., of approximately +220VDC) at the first UPS output 191 and a negative DC output voltage (e.g., of approximately −220VDC) at the second UPS output 192.

The first voltage source line (LINE 1) 11 is connected to the first UPS input 101 (which is connected to the second leg node 123 of the three phase rectifier bridge 140). The second voltage source line (LINE2) 21 is connected to the second UPS input 102 (which is connected to the third leg node 133 of the three phase rectifier bridge 140). There is no connection to the third UPS input 103 or the fourth UPS input 104 since the neutral 41 of the electrical utility configuration 2 (FIG. 1) is not connected. Although the first input filter inductor (L1) 141 is connected in series with the second input filter inductor (L2) 142, the current is limited through each of the input filter inductors 141, 142 at this higher input voltage (208VAC/240VAC), allowing for the use of smaller sized input filter inductors 141, 142 (e.g., 1.0 mH).

In one embodiment, the connections between the first and second voltage sources 10, 20 and the UPS input stage 100 can be made directly, while in another embodiment as shown in FIG. 5, the PDU 200 can be employed to provide an interface between the first and second voltage sources 10, 20 and the UPS input stage 100 inputs 101, 102. The first voltage source line (LINE 1) 11 is connected to the first PDU input 201, which is connected through the PDU 200 to the first PDU output 211, which can then be connected to the first UPS input 101. Similarly, the second voltage source line (LINE2) 21 is connected to the second PDU input 202, which is connected through the PDU 200 to the second PDU output 212, which can then be connected to the second UPS input 102.

Figure 6:
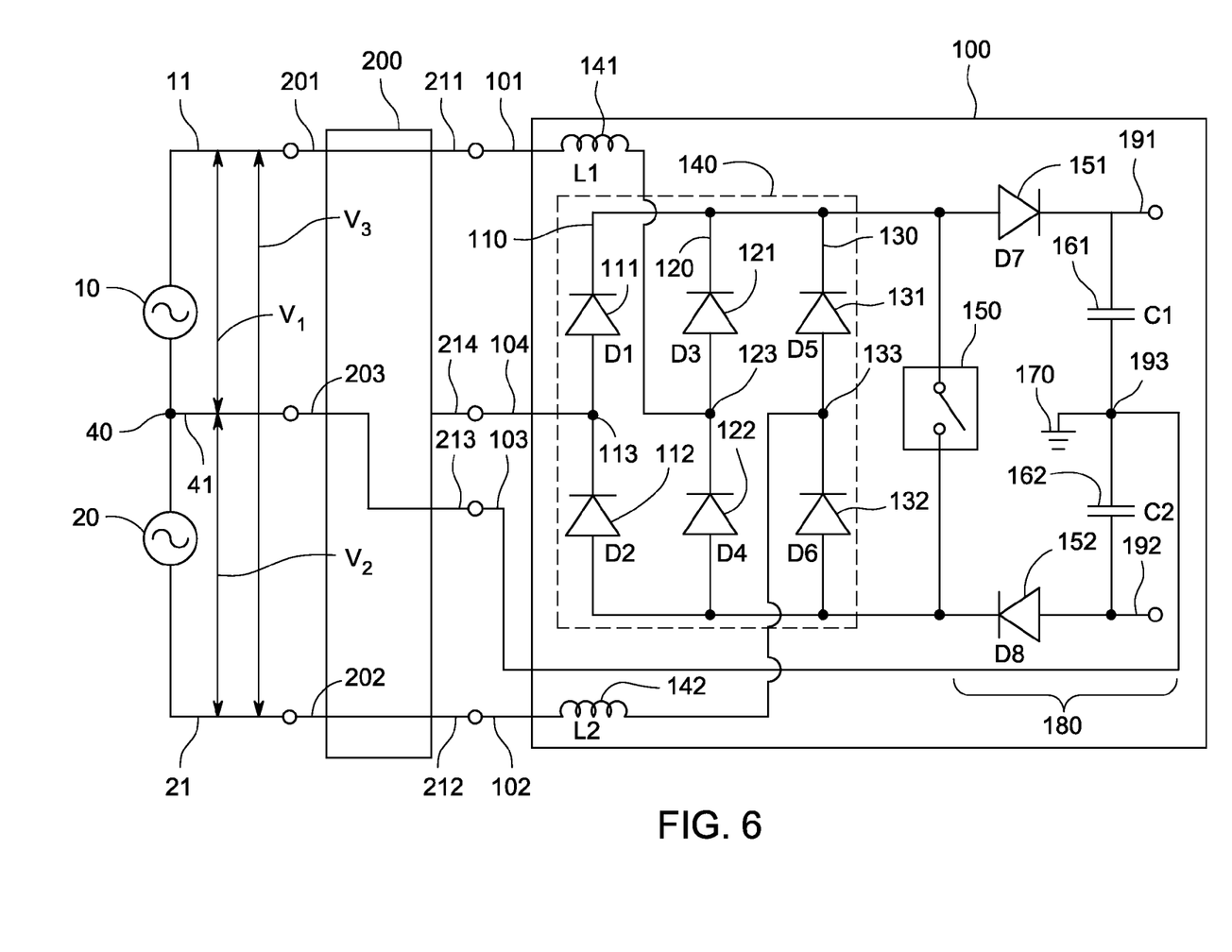
FIG. 6 is a schematic diagram of the exemplary UPS input stage of FIG. 3 connected to the exemplary electrical utility configuration of FIG. 1 with a neutral connected to the UPS for a three-wire 208VAC/240VAC split phase input voltage.

FIG. 6 is a schematic diagram of the exemplary UPS input stage 100 of FIG. 3 connected to the exemplary electrical utility configuration 2 of FIG. 1 with a neutral 41 connected to the UPS input stage 100 for a three-wire 120VAC split phase input voltage ($V_{1,2}$=120VAC at a phase angle of 180° resulting in $V_3$=240VAC or $V_{1,2}$=120VAC at a phase angle of 120° resulting in $V_3$=208VAC). The configuration of FIG. 6 for the three-wire split phase input voltage will provide a positive DC output voltage (e.g., of approximately +220VDC) at the first UPS output 191 and a negative DC output voltage (e.g., of approximately −220VDC) at the second UPS output 192.

The first voltage source line (LINE 1) 11 is connected to the first UPS input 101 (which is connected to the second leg node 123 of the three phase rectifier bridge 140). The second voltage source line (LINE2) 21 is connected to the second UPS input 102 (which is connected to the third leg node 133 of the three phase rectifier bridge 140). The neutral 41 of the electrical utility configuration 2 (FIG. 1) is connected to the third UPS input 103 (which is connected to the output bus ground node 193).

In one embodiment, the connections between the first and second voltage sources 10, 20 and the UPS input stage 100 can be made directly, while in another embodiment as shown in FIG. 6, the PDU 200 can be employed to provide an interface between the first and second voltage sources 10, 20 and the UPS input stage 100 inputs 101, 102. The first voltage source line (LINE 1) 11 is connected to the first PDU input 201, which is connected through the PDU 200 to the first PDU output 211, which can then be connected to the first UPS input 101. Similarly, the second voltage source line (LINE2) 21 is connected to the second PDU input 202, which is connected through the PDU 200 to the second PDU output 212, which can then be connected to the second UPS input 102. The neutral 41 of the electrical utility configuration 2 (FIG. 1) is connected to the third PDU input 203, which is connected through the PDU 200 to the third PDU output 213, which can then be connected to the third UPS input 103.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An uninterruptible power supply (UPS) apparatus for receiving power from a two-wire 120 VAC single phase input voltage having a first voltage source line and a neutral, the apparatus comprising:
    a three phase rectifier bridge comprising
        a first leg comprising a first rectifier diode and a second rectifier diode with a first leg node located between and connecting the first and second rectifier diodes,
        a second leg comprising a third rectifier diode and a fourth rectifier diode with a second leg node located between and connecting the third and fourth rectifier diodes, and
        a third leg comprising a fifth rectifier diode and a sixth rectifier diode with a third leg node located between and connecting the fifth and sixth rectifier diodes,
        wherein the first leg, the second leg, and the third leg are connected in parallel;
    a switch connected in parallel with the three phase rectifier bridge;
    a direct current output circuit connected in parallel with the three phase rectifier bridge and the switch, the direct current output circuit comprising a first output bus and a second output bus with an output bus ground node located between and connecting the first output bus and the second output bus;
    a first UPS input connected to the second leg node of the three phase rectifier bridge with a first input filter inductor located between and connecting the first UPS input to the second leg node;
    a second UPS input connected to the third leg node of the three phase rectifier bridge with a second input filter inductor located between and connecting the second UPS input to the third leg node;
    a third UPS input directly connected to the output bus ground node;
    a fourth USP input directly connected to the first leg note of the three phase rectifier bridge;
    a power distribution unit (PDU) for providing an interface for connecting the two-wire 120 VAC single phase input voltage to the UPS, the power distribution unit comprising:
        a first PDU output directly connected to the first UPS input;
        a second PDU output directly connected to the second UPS input;
        a third PDU output directly connected to the third UPS input;
        a fourth PDU output directly connected to the fourth UPS input;
        a first PDU input directly connected to the first PDU output and the second PDU output; and
        a third PDU input directly connected to the third PDU output and the fourth PDU output.

2. The uninterruptible power supply apparatus of claim 1, wherein the first voltage source line is connected to the first PDU input and wherein the neutral is connected to the third PDU input.

3. The uninterruptible power supply apparatus of claim 1, wherein the switch comprises one or more insulated gate bipolar transistors.

4. The uninterruptible power supply apparatus of claim 1, wherein the switch comprises one or more metal-oxide-semiconductor field-effect transistors.

5. The uninterruptible power supply apparatus of claim 1, wherein the direct current output circuit further comprises:
    a seventh rectifier diode located between and connecting the switch and the first output bus, with the anode of the seventh rectifier diode connected to the switch and the cathode of the seventh rectifier diode connected to the first output bus; and
    an eighth rectifier diode located between and connecting the switch and the second output bus, with the cathode of the eighth rectifier diode connected to the switch and the anode of the eighth rectifier diode connected to the second output bus.

* * * * *